(12) United States Patent
Malchow et al.

(10) Patent No.: US 6,620,490 B1
(45) Date of Patent: Sep. 16, 2003

(54) TEAR-RESISTANT BOND PATTERN

(75) Inventors: Gregory Lynn Malchow, Oshkosh, WI (US); Daniel Hoo, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 121 days.

(21) Appl. No.: 09/651,041

(22) Filed: Aug. 30, 2000

(51) Int. Cl.$^7$ ................................................ B32B 27/14
(52) U.S. Cl. ........................ 428/196; 428/198; 442/394; 604/372
(58) Field of Search ................................ 428/196, 198; 442/394; 604/358, 365, 372

(56) References Cited

U.S. PATENT DOCUMENTS

| | | | |
|---|---|---|---|
| 3,087,833 A | * | 4/1963 | Drelich ........................ 428/198 |
| 3,575,764 A | * | 4/1971 | McFarren ................ 156/306.6 |
| 4,275,105 A | * | 6/1981 | Boyd et al. ................. 428/198 |

FOREIGN PATENT DOCUMENTS

WO     WO 99/14415    *   3/1999

* cited by examiner

Primary Examiner—Elizabeth M. Cole (57) ABSTRACT

The bonded composite in accordance with the invention has first and second thin-section sheet materials bonded together by bond elements defining a bond pattern. The bond elements can consist of stress receptor elements, stress transfer and dissipation elements, and stress termination elements. In general, the stress receptor elements, and the transfer and dissipation elements, receive stresses into the bond pattern, and distribute stresses internally, generally inwardly into the interior of the bond pattern. The termination elements function to accumulate and coordinate termination of stresses transferred from the receptor elements and the transfer and dissipation elements. In general, bond elements in the interior of the bond pattern are closer together than bond elements proximate the side edges of the bond pattern. Bonds corresponding to the bond elements can be formed via a wide variety of bond forming processes, including thermal energy and ultrasonic-frequency energy. The bond elements preferably occupy from about 10 percent to about 40 percent of the overall area of the bond pattern. Exemplary use of the bond pattern is illustrated in an absorbent article. The absorbent article in the present invention can serve a variety of functions including, but not limited to, a feminine hygiene article, diaper, or adult incontinence product.

84 Claims, 3 Drawing Sheets

TEAR-RESISTANT BOND PATTERN

BACKGROUND

The present invention relates to a bonded composite of a first thin-section element of sheet material and a second thin-section element bonded together by bond elements defining a bond pattern. More particularly, one of the contemplated applications for the present invention is in bonding outer cover and body-side liner thin-section elements of absorbent articles to one another.

Personal care absorbent articles have been known for a long time as hygiene products. They find use, for example, as diapers, incontinence inlays, or in women's sanitary pads. Such personal care absorbent articles are constructed in such a way that they can absorb and store liquid bodily excretions such as urine, menstrual fluid, or blood. Women's sanitary pads are used, for example, to absorb the liquids excreted prior to, during and, after menstruation.

In absorbent articles, the portions of the article where different layers or components are bonded to each other tend to incur significant stress concentrations, and in absorbent articles using conventional bond patterns, tend to fracture at those bonded locations under such stresses. In conventional patterns used in absorbent articles, bond locations are disposed in uniform and crossing straight lines and straight rows of circular bond elements. The inventors herein have noted that such bond configuration has been found to enhance the probability that the absorbent article will tear and that the tear propagates along the side edge of the bond pattern. Tearing properties of such conventional patterns can be compared to perforated paper forms.

The problem addressed in the present invention is thus to provide a bonded composite demonstrating a bond pattern, and an absorbent article implementing the bond pattern, whereby the configuration of the bond pattern discourages the possibility for fracture of the bonded composite or absorbent article at the bond pattern.

The present invention solves this problem by means of the bonded composite as well as the absorbent article both disclosed and described in the independent claims. Additional advantageous embodiments of the absorbent article in accord with the invention and of the process in accordance with the invention arise from the dependent claims, the specification, and the drawings.

It is an object of this invention to reduce the ease of tearing of a bonded composite or absorbent article by introducing bonding locations and configurations which discourage straight fracture of the bonded materials, and encourage dissipating an initially concentrated force within a substantial area of the bonding pattern.

It is still another object to provide a bond pattern wherein bond elements on the interior of the bond pattern are closer together than bond elements proximate the side edges of the bond pattern.

SUMMARY

In a first family of embodiments, the invention comprehends a bonded composite, and personal care absorbent articles made therewith. The bonded composite comprises, as a first thin-section element, a first layer of thin-section sheet material, and a second thin-section material element bonded to the first thin-section element by bond elements defining a bond pattern. The bond pattern has a pattern length as well as a pattern width represented by first and second side edges of the bond pattern. A central longitudinal axis divides the bond pattern longitudinally. The side edges of the bond pattern, and the overall area of the bond pattern, are defined generally by those areas of the respective thin-section elements which participate in absorbing and dissipating, by operation of the bond pattern, stresses received into the bond pattern. The bond pattern reflects application of force urging the first and second thin-section elements toward each other in face-to-face relationship to form an array of separate, distinct, and spaced elongate bond elements affixing the first and second thin-section elements to each other. The bond elements typically include stress receptor elements, stress transfer and dissipation elements, and optionally stress termination elements. The stress receptor elements are employed as a first sub-array of longitudinally-oriented separate, distinct, and spaced elements disposed proximate the side edges of, and along the length of, the bond pattern. The stress transfer and dissipation elements are employed as a second sub-array of longitudinally-oriented separate, distinct, and spaced elements spaced along the length of the bond pattern, inwardly of the side edges of the bond pattern and generally inwardly of the stress receptor elements. Respective transfer and dissipation elements have first ends disposed at an interior portion of the bond pattern, and extending to second ends adjacent the side edges of the bond pattern between respective ones of the stress receptor elements. The stress transfer and dissipation elements direct stresses inwardly into the interior portion of the bond pattern, such stresses being dissipated in the interior portion of the bond pattern.

The bonded composite can comprise, as ones of the bond elements, a third sub-array of longitudinally-oriented separate, distinct, and spaced stress termination elements disposed generally inwardly of the transfer and dissipation elements, on opposing sides of, and oriented generally along, the central longitudinal axis. The stress termination elements tend to accumulate and coordinate termination of stresses transferred into an interior portion of the bond pattern.

The transfer and dissipation elements can have first ends disposed relatively inwardly from the side edges and second ends disposed toward the side edges such that the second ends tend to receive stress imposed from outside the bond pattern and the first ends tend to dissipate the stress at interior portions of the bond pattern.

In some embodiments, the bond pattern comprises first and second opposing pattern combinations corresponding to first and second sides of the bond pattern, on opposing sides of the longitudinal axis. Each such pattern combination comprises ones of the stress receptor elements at the side edges of the bond pattern, ones of the transfer and dissipation elements being disposed inwardly of the stress receptor elements, and ones of the stress termination elements being disposed inwardly of the transfer and dissipation elements.

In preferred embodiments, the first and second pattern combinations are substantially the same.

In some embodiments, the first and second bond patterns are positioned along the length of the pattern such that the pattern combinations are asymmetric with respect to each other. Although asymmetric with each other, the respective first and second pattern combinations are preferably each internally symmetric as well as being symmetric with respect to the length of the bond pattern.

Bonds corresponding to the bond elements can be activated by application of thermal energy or ultrasonic-frequency energy to at least one of the thin-section elements.

Preferably, at least one of the first thin-section element and the second thin-section element comprises polymeric material selected from the group consisting of polyolefins including polyethylenes and polypropylenes, polyesters, and polyamides, and copolymers, mixtures, and blends of such polymeric materials.

In some embodiments, at least one of the first thin-section element and the second thin-section element comprises a fibrous web defining a multiplicity of randomly-spaced small openings extending from a major surface of the web into the interior of the web.

In some embodiments, the stress receptor elements and the stress transfer and dissipation elements, in combination, alternate along the length, and on opposing side edges, of the bond pattern, and thereby provide side-to-side balance to the bond element area of the bond pattern, so as to tend to attenuate torsional forces on the bonding apparatus used in forming the respective bond elements.

In preferred embodiments, the stress receptor elements and the stress transfer and dissipation elements, in combination, alternate along the length, and on opposing side edges, of the bond pattern, and thereby provide continuous, side-to-side balance to the bond element area of the bond pattern, so as to tend to attenuate torsional forces on the bonding apparatus used in forming the respective bond elements.

The bond elements preferably occupy from about 10 percent to about 40 percent, more preferably from about 12 percent to about 30 percent, and still more preferably from about 15 percent to about 25 percent of the overall bond area of the bond pattern.

In the absorbent article implementation, the first and second thin-section elements can, in combination, comprise an outer cover and a body side liner. At least one of the body side liner and the outer cover can comprise polymeric material selected from the group consisting of polyolefins including polyethylenes and polypropylenes, polyesters, and polyamides, and mixtures, copolymers, and blends of such polymeric materials. The body side liner can comprise material selected from the group consisting of porous foams, reticulated foams, apertured polymeric films, polymeric fibers, and natural fibers.

Further to the personal care absorbent article implementation, the length of the bond pattern can extend from the front portion of the absorbent article to the rear portion of the absorbent article.

In some embodiments, the crotch portion is devoid of the bond pattern.

In personal care absorbent article implementations, the width of the bond pattern is preferably about 4 millimeters to about 14 millimeters, more preferably about 5 millimeters to about 12 millimeters.

Such personal care absorbent article can comprise, for example and without limitation, a feminine hygiene article, a diaper, or an adult incontinence product.

In a second family of embodiments, the invention comprehends a bonded composite, and personal care absorbent articles made therewith. The bonded composite comprises, as a first thin-section element, a first layer of thin-section sheet material, and a second thin-section element bonded to the first thin-section element by bond elements defining a bond pattern. The bond pattern has a pattern length, a pattern width represented by first and second side edges of the bond pattern, and a central longitudinal axis extending along an interior portion of the bond pattern. The side edges of the bond pattern are defined generally by those areas of the respective thin-section elements which participate in absorbing and dissipating, by operation of the bond pattern, stresses received into the bond pattern. The bond pattern reflects application of force urging the first and second thin-section elements toward each other in face-to-face relationship to form an array of separate, distinct, and spaced elongate bond elements affixing the first and second thin-section elements to each other. Ones of the bond elements in the interior portion of the bond pattern are spaced closer together than the bond elements proximate the side edges.

Correspondingly, the bond elements disposed toward the side edges are spaced farther apart than the bond elements in the interior portion of the bond pattern.

In some embodiments, the bond pattern comprises, as ones of the bond elements, a first sub-array of longitudinally-oriented separate, distinct, and spaced stress receptor elements disposed at the side edges of, and along the length of, the bond pattern, and as ones of the bond elements, a second sub-array of longitudinally-oriented separate, distinct, and spaced transfer and dissipation elements spaced along the length of the bond pattern, inwardly of the side edges of the bond pattern and generally inwardly of the stress receptor elements. Respective transfer and dissipation elements have first ends disposed at interior portions of the bond pattern, and extend to second ends adjacent the side edges of the bond pattern between respective ones of the stress receptor elements. The stress transfer and dissipation elements direct stresses inwardly into the interior portion of the bond pattern. Such stresses are generally dissipated in the interior portion of the bond pattern.

In preferred embodiments, stress receptor elements are disposed at the side edges of the bond pattern, and spaced at first common distances from each other along the length of the bond pattern. Transfer and dissipation elements are disposed inwardly of the side edges and inwardly of the stress receptor elements, and at second distances from the stress receptor elements less than the spacing of the stress receptor elements from each other.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 1:
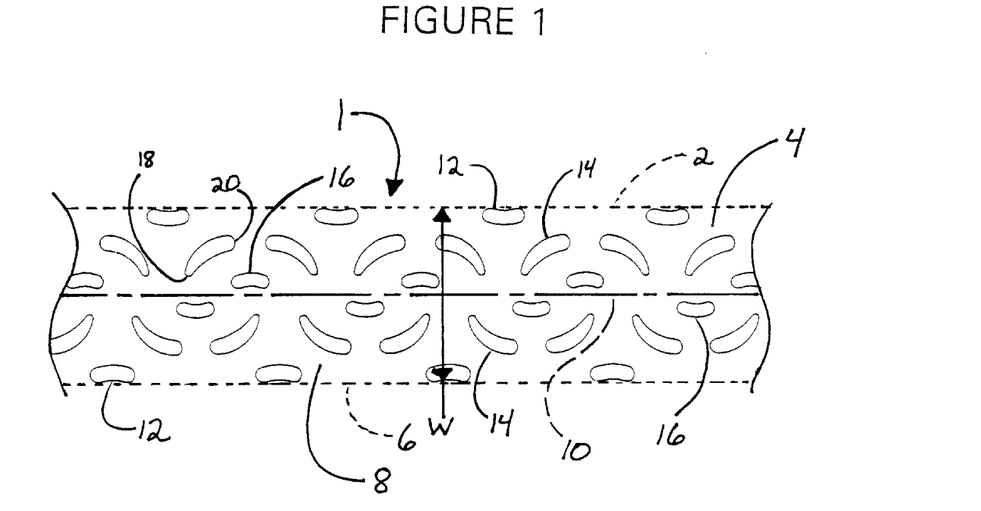
FIG. 1 shows a plan view of a representative bond pattern of this invention.

FIG. 1 shows a bond pattern 1 having a first side edge 2 and a second side edge 6. A central longitudinal axis 10 divides the bond pattern 1 into a first pattern combination 4 and a second opposing pattern combination 8. Bond pattern 1 has a pattern length defined generally as the distance by which the pattern extends along the central longitudinal axis 10, and a pattern width "W" represented by the distance between first side edge 2 and second side edge 6. Correspondingly, the overall area of the bond pattern is defined as the area which participates in absorbing and dissipating, by operation of the bond pattern, stresses received into the bond pattern.

The portion of bond pattern 1 which is located between central longitudinal axis 10 and first side 2 makes up first pattern combination 4. Correspondingly, the portion of bond pattern 1 which is located between central longitudinal axis 10 and second side edge 6 makes up second opposing pattern combination 8. In the embodiment of FIG. 1, first opposing pattern combination 4 and second opposing pattern combination 8 represent substantially the same arrangement of bond elements and bone element relationships and are employed as longitudinally off-set mirror images of each other. The first and second opposing pattern combinations are positioned along the length of the pattern such that the opposing pattern combinations are asymmetric with respect to each other to the extent of the longitudinal off-set. While the opposing patterns are asymmetric with respect to each other, both pattern combination 4 and pattern combination 8 are internally symmetric, as well as being symmetric with respect to the length of bond pattern 1.

In one embodiment, bond pattern 1 comprises a pattern density defined generally by the number of bond elements within a defined portion of the pattern area, wherein bond elements proximate the side edges are spaced farther apart from each other than bond elements which are disposed more away from the side edges, thus creating a pattern density which is less dense at the side edges of the pattern than away from the side edges.

In the illustrated embodiments, each of the opposing pattern combinations comprises stress receptor elements 12 proximate the side edges of the bond pattern, transfer and dissipation elements 14 disposed inwardly of the stress receptor elements 12, and stress termination elements 16 disposed inwardly of transfer and dissipation elements 14. A plurality of such bond elements establishing repeated element combinations and spacial arrangements, along the length of the bond pattern, defines a repeat pattern. The repeat patterns are spaced along the length of the bond pattern.

In the illustrated embodiments, each pattern combination is internally symmetric about each stress receptor element and about each stress termination element. Thus, to the extent of the length of the bond pattern, each pattern combination defines left and right mirror images of each other from a selected such stress receptor element or stress termination element.

Stress receptor elements 12 are shown disposed proximate side edges 2 and 6, along the length of bond pattern 1 as a first sub-array of longitudinally-oriented separate, distinct, and spaced bond elements. Stress transfer and dissipation elements 14 are shown as a second sub-array of transversely-oriented separate, distinct, and spaced bond pattern elements spaced along the length of the bond pattern. The stress transfer and dissipation elements are disposed inwardly of the side edges of the bond pattern and generally inwardly of the stress receptor elements 12. A third sub-array of longitudinally-oriented separate, distinct, and spaced stress termination elements 16 is disposed generally inwardly of the transfer and dissipation elements 14 on opposing sides of, and oriented generally along, central longitudinal axis 10. In the illustrated embodiments, combinations of one stress receptor element 12 and two stress transfer and dissipation elements 14 alternate with each other along the length of the bond pattern on both sides of the bond pattern, and thereby provide a side-to-side walking advance of element groupings along the length of the bond pattern. Bond pattern combinations 4 and 8 are thus longitudinally asymmetric with respect to each other, according to the longitudinal off-set, along the length of the bond pattern thereby to distribute the collective bond element widths more evenly along the length of the bond pattern. Such distribution contributes to service life of the rolls used in a rotary bonding nip.

Pattern combinations 4, 8 are internally symmetric with respect to a selected stress receptor element of the respective pattern combination, each pattern combination thus defining left and right mirror images of pattern elements on opposing sides of a selected stress receptor element.

In the illustrated embodiments, first and second adjacent ones of the transfer and dissipation elements define a first portion of the length of the bond pattern. The first portion of the length is shorter than the end-to-end distance between adjacent ones of the stress receptor elements, the end-to-end distance being measured to include an end-to-end dimension of one of the stress receptor elements, measured along the length of the bond pattern.

Also in the illustrated embodiments, a first distance from a first end of a given stress receptor element to the closest transfer and dissipation element to the first end being less than a second distance to the next adjacent stress receptor element, a third distance from the second end of the given stress receptor element to the closest transfer and dissipation element to the second end is less than a fourth distance from the second end to the stress receptor element next adjacent the second end of the given stress receptor element.

A stress transfer and dissipation element 14 is further defined as having a first end 18 and a second end 20. The first end 18 of a stress transfer and dissipation element 14 is disposed at an interior portion of the bond pattern relative to the second end 20. The second end 20 of a stress transfer and dissipation element 14 is located adjacent a respective side edge of the bond pattern between and inwardly of respective ones of the stress receptor elements 12. Second ends 20 of stress transfer and dissipation elements 14 are also distinguished from first ends 18 in that the second end of a respective element 14 has a greater radius of curvature in plan view than first end 18 of the same element 14.

The several bond elements preferably occupy from about 10 percent to about 40 percent of the overall bond area of the bond pattern. In a more preferable application of bond pattern 1, the bond elements occupy from about 12 percent to about 30 percent of the overall bond area of the bond pattern. Yet in an even more preferable application of bond pattern 1, the bond elements occupy from about 15 percent to about 25 percent of the overall bond area of the bond pattern. The specific preferred fraction varies from pattern to pattern, from process to process, considering the material being bonded. If the element fraction is too low, the elements are unable to cooperatively support each other whereby the stress may not be adequately attenuated in the bond pattern and whereby a lack of minimum bond element density may result in layers of a bonded composite disassociating from one another. If the element fraction is too high, areas of the web between bond elements are not sufficiently extensive to enable unbonded areas of the web material, in the bond pattern area, to effectively distribute the stresses among adjacent bond elements or to dissipate the stresses internally within e.g. unbonded portions of the bond pattern.

In some embodiments of the present invention, bond pattern 1 can be used to unite sheets of material along the entirety of the length of the material, or in the case of the examples illustrated herein, along the entirety of the length or width of an absorbent article.

In another family of embodiments of the present invention, bond pattern 1 can be used to unite intermittent segments of a defined length of the e.g. absorbent article.

In yet another family of embodiments of the present invention, bond pattern 1 can be used to unite variable-width segments of a length of the e.g. absorbent article.

In still another family of embodiments of the present invention, bond pattern 1 can be used to unite materials along a defined length of the materials being bonded. In all of the embodiments, bond pattern 1 can be used to bond smaller elements such as separate and distinct work pieces to a larger element such as a generally endless web.

Figure 2:
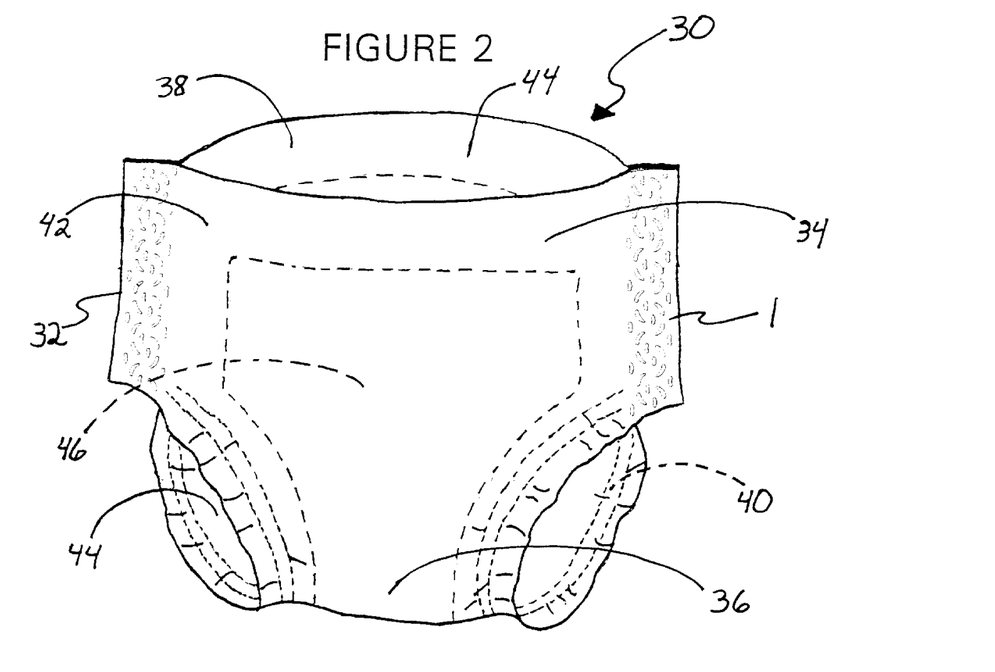
FIG. 2 shows, as a representative absorbent article, a pair of training pants illustrating use of the bond pattern of FIG. 1 along the side seams.
Figure 3:
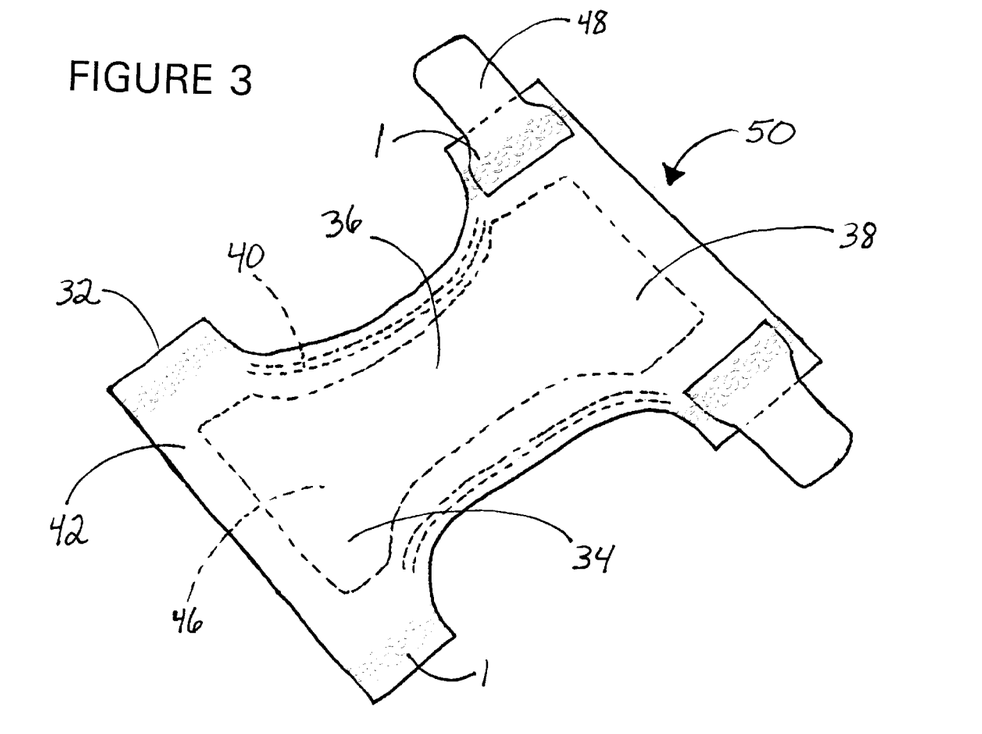
FIG. 3 shows, as another representative absorbent article, a diaper illustrating use of the bond pattern of FIG. 1 along the side seams as well as to adhere the ears to the outer cover.

Referring to FIGS. 2 and 3, a pair of training pants 30 and a diaper 50, respectively, both illustrate the use of bond pattern 1 of FIG. 1. FIGS. 2 and 3 each show an absorbent article having a front portion 34, a rear portion 38, and a crotch portion 36 which joins the front portion 34 and rear portion 38 together.

Both absorbent articles of FIGS. 2 and 3 comprise liquid-impermeable outer cover 42 as a first thin-section element of sheet material, a liquid-permeable body-side liner 44 as a second thin-section element, and a liquid-absorbent core 46 between the outer cover and the body side liner. Additionally, side edges are given the reference number 32, leg elastic is given the reference number 40, and in FIG. 3, the diaper ear has a reference number 48.

Various woven and nonwoven fabrics can be used for body-side liner 44. For example, a body-side liner 44 can be comprised of a meltblown or spunbonded web of polymeric material selected from the group consisting of polyolefins including polyethylenes and polypropylenes, polyesters, and polyamides, and mixtures, copolymers, and blends of such polymeric fibers. Body-side liner 44 may also comprise a carded and/or bonded web composed of natural and/or synthetic fibers. The body-side liner can also be composed of a substantially hydrophobic material wherein the hydrophobic material is treated with a surfactant or otherwise processed to impart a desired level of wettability and hydrophilicity. In a particular embodiment of the present invention, body-side liner 44 may comprise a nonwoven, spunbonded, polypropylene fabric composed of about 2.8–3.2 denier fibers formed into a web having a basis weight of about 22 grams per square meter and a density of about 0.06 grams per cubic centimeter. The fabric is then surface treated with about 0.3 weight percent of a surfactant. Body-side liner 44 is typically composed of a fibrous web defining a multiplicity of small openings randomly spaced according to location and orientation of the fibers, and extending from a major surface of the web into the interior of the web. Such small openings typically extend through the entirety of the thickness of the web. In a particular embodiment of the present invention, body-side liner 44 can comprise material selected from the group consisting of porous foams, reticulated foams, apertured polymeric films, polymeric fibers, and natural fibers. Body-side liner 44 can comprise a multiplicity of components or layers which correspond to any of the materials disclosed herein, as well as others known in the art.

It is generally preferred that outer cover 42 of the absorbent article be formed from a material which is substantially impermeable to liquids. A typical outer cover 42 can be manufactured from a thin plastic film or other flexible liquid-impermeable material. For example, outer cover 42 can be formed from a film of polymeric material selected from the group consisting of polyolefins including polyethylenes and polypropylenes, polyesters, and polyamides, and mixtures, copolymers, and blends of such polymeric materials, having thicknesses, for example, of from about 0.012 millimeters to about 0.13 millimeters. If outer cover 42 should have a more cloth-like feeling, it may comprise a polyethylene film laminated to a surface of a nonwoven web, such as a spunbonded web of polyolefin fibers. For example, a polyethylene film having a thickness of about 0.015 millimeters may have thermally or otherwise laminated thereto a spunbond web of polyolefin fibers having a thickness from 1.5 to 2.5 denier per filament, which nonwoven web has a basis weight of e.g. about 24 grams per square meter. Further, outer cover 42 can be formed of a woven or nonwoven fibrous web which has been totally or partially constructed or treated to impart a desired level of liquid impermeability to selected regions which are adjacent or proximate absorbent core 46. Still further, outer cover 42 can optionally be composed of a micro-porous material which permits vapors to escape from absorbent core 46 and through outer cover 42 while preventing liquid exudates from passing through the outer cover.

One or both of outer cover 42 and body-side liner 44 may comprise a fibrous web defining a multiplicity of randomly-spaced small openings extending from a major surface of the web into the interior of the web. It is important to note that polymeric material selected from the group consisting of polyolefins including polyethylenes and polypropylenes, polyesters, and polyamides, and mixtures, copolymers, and blends of such polymeric materials can be used, in either film form or in non-woven fiber form, for one or both of body-side liner 44 and outer cover 42. Also, included in a definition of polymeric material above should be all routine, common, normal additives known to those skilled in the art of polymeric materials such as processing aids, chemical stabilizers, compatibilizers where more than one polymer is used, fillers, and the like.

Absorbent core 46 suitably comprises hydrophilic fibers, such as a web or matt or loose collection of cellulosic fluff, in combination with a high-absorbency material commonly known as superabsorbent material. In a particular embodiment, absorbent core 46 comprises a mixture of superabsorbent hydrogel-forming particles and wood pulp fluff. In place of the wood pulp fluff, one may use synthetic, polymeric, meltblown fibers or a combination of meltblown fibers and natural fibers. The superabsorbent material may be substantially homogeneously mixed with the hydrophilic fibers or may be otherwise combined into absorbent core 46.

Alternatively, absorbent core 46 can comprise a laminate of fibrous webs and superabsorbent material or other suitable means of maintaining a superabsorbent material in a localized area. Absorbent core 46 can additionally comprise an uncreped through air dried paper web material known as UCTAD.

Absorbent core 46 can have any of a number of shapes. For example, absorbent core 46 can be rectangular, I-shaped or T-shaped. It is generally preferred that the absorbent core 46 be narrower in the crotch portion than the rear portion or front portion.

The high-absorbency material in absorbent core 46 can be selected from natural, synthetic and modified natural polymers and materials. The high absorbency materials can be inorganic materials, such as silica gels, or organic compounds, such as crosslinked polymers. The term crosslinked refers to any means for effectively rendering normally water-soluble materials substantially water insoluble but swellable, whereby absorbent properties are available but the swelled material is substantially immobile after absorbing water-based liquids. Such means for crosslinking can include, for example, physical entanglement, crystalline domains, covalent bonds, ionic complexes and associations, hydrophilic associations such as hydrogen bonding, and hydrophobic associations or Van der Waals forces.

Figure 4:
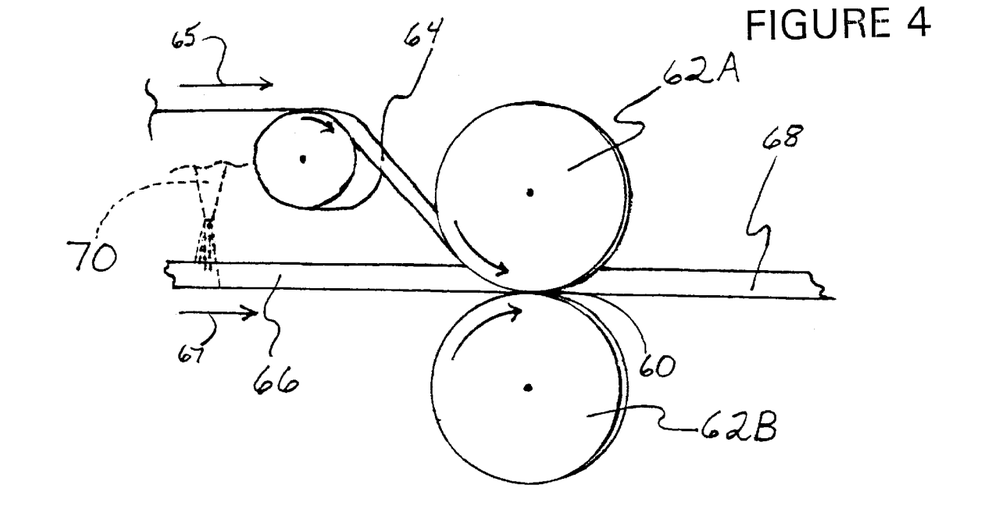
FIG. 4 shows a representative side pictorial view of a bonding nip such as can be used in continuous bonding processes employing bond patterns of the invention.

FIG. 4 represents a side pictorial view of a bonding nip 60 such as can be used in continuous bonding processes employing bond patterns of the invention. The bonding nip 60 is formed between two rotating rolls 62A, 62B. Rolls 62A, 62B can be mounted at any orientation, in relationship to each other, so long as energy can be transmitted between the rolls to promote bonding. In the present illustration, rolls 62A, 62B are mounted in a vertical orientation, one with respect to the other. To create the bond pattern of the invention, web 64 and web 66 are fed from the left side of FIG. 4 as indicated by respective arrows 65, 67, and are urged toward each other in face-to-face relationship, in bonding nip 60, to form an array of separate, distinct, and spaced elongate bond elements affixing the first and second thin-section sheet materials to each other according to the bond pattern illustrated in e.g. FIG. 2. The bond pattern, as well as the individual bond elements, can be activated by a variety of methods including but not limited to applying pressure, thermal energy, or ultrasonic-frequency energy to the webs at bonding nip 60.

The workpiece being defined for this illustration can include one or more of web 64, web 66, and the resultant bonded composite 68.

As an alternative to thermal energy or ultrasonic energy, e.g. chemical adhesives can be used to create the bond pattern. FIG. 4 indicates an optional use of adhesive instead of adhesion via pressure, thermal energy or ultrasonic energy. While optional adhesive applicator 70 shows the adhesive being applied as a spray to web 66, optional adhesive applicator 70 is meant to be representative of various other methods of positioning adhesive between web 64 and web 66. Those other methods include but are not limited to coating from a coating roll, dip applications, wire rod spreaders, and the like. As with the methods of obtaining adhesion, the types of chemical adhesive contemplated for this invention run the full range of all known adhesives which are suitable for bonding the materials of interest, for example and without limitation, contact adhesives, pressure sensitive adhesives, hot melt adhesives, and two-part chemically activated adhesives.

In the embodiments illustrated in FIGS. 2 and 3, the bond patterns created by the process described and illustrated in FIG. 4 join the superposed webs at locations generally corresponding to the ultimate locations of side seams 32 in the finished absorbent articles. As stated previously, such articles typically comprise an assemblage of two or more layers or partial layers, along with other elements. Compositions of the layers can be the same, or different. Typically, web materials are woven or non-woven fabrics, or polymer film.

As illustrated in FIG. 4, an absorbent article precursor, commonly referred to in the art as a work piece, can be defined as part of a continuously processed, continuous length, composite web of materials. As a work piece is defined, a bond pattern may be formed e.g. at side seams 32 either before or after the absorbent article is severed from the web, either as a fully finished or partially finished absorbent article.

While FIG. 4 shows only one method of implementing the bond pattern to form a bonded composite, other processes are contemplated such as creating the bond pattern using a plunge or press ultrasonic horn, rotary ultrasonic horn and anvil, or any other process capable of creating the bond pattern using pressure, thermal energy, ultrasonic energy, adhesive, or the like. Additionally, the materials listed as possible materials capable of comprising an outer cover and a body-side liner, as listed in the description under FIGS. 2 and 3, are exemplary of the contemplated materials for comprising a bonded composite of the invention.

Figure 5:
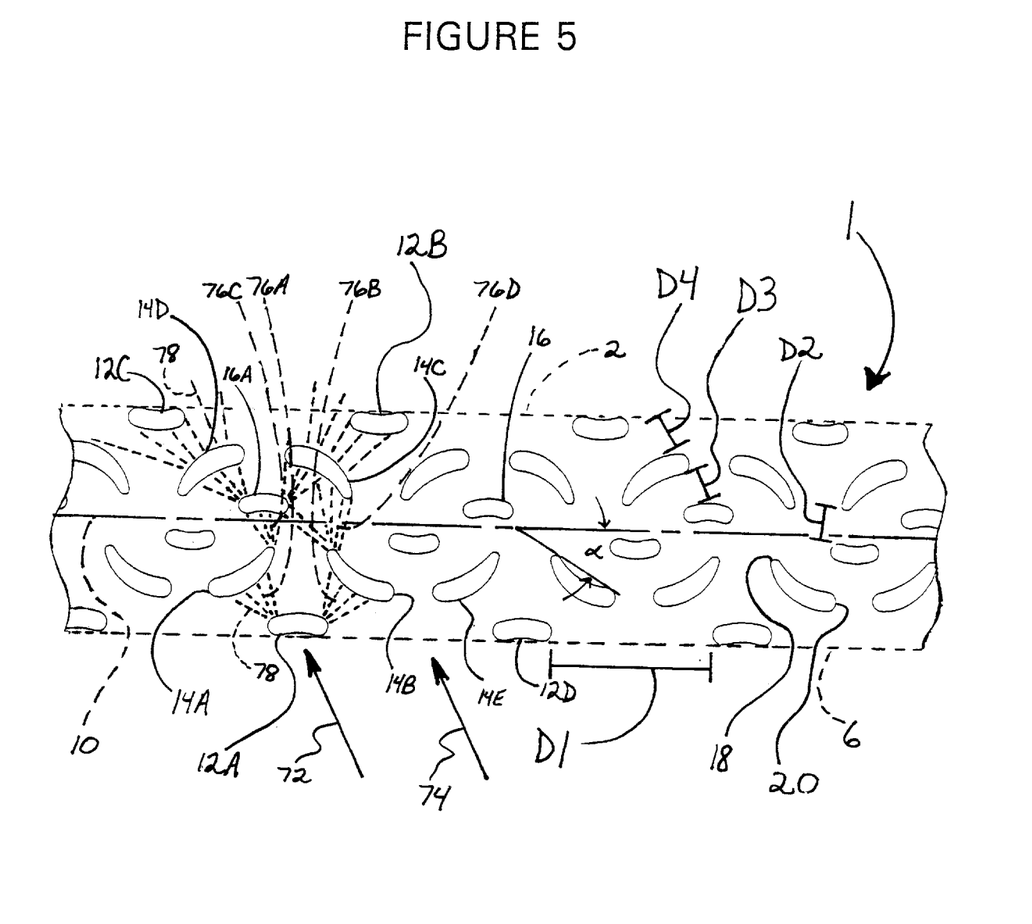
FIG. 5 shows an enlarged representation of the relationships between the stress receptor elements, the transfer and dissipation elements, and the stress termination elements.

FIG. 5 shows a magnified view of one embodiment of a bond pattern 1 of the invention. The illustrated bond pattern includes stress receptor elements 12, stress transfer and dissipation elements 14, and stress termination elements 16, and a central longitudinal axis 10 which is, typically, not expressed in visible form on the bonded article. The bond pattern elements comprise elongate bond elements, which includes any bond element that is not round, thus modest non-circularity can be elongate, and only circular configurations are generally ruled out of the group comprising elongate bond elements. Reference number 18 still represents the first interior end of a stress transfer and dissipation element, and the second outer end of a stress transfer and dissipation element is again referenced by the number 20.

While this invention is generally described in terms of elongate bond elements, a limited number of circular bond elements can be used in the bond pattern so long as the number and placement of such circular bond elements are consistent with the principles taught herein for directing stress inwardly away from the side edges of the bond pattern.

FIG. 5 also demonstrates the relationships of the different bond elements to each other. In one preferred embodiment, D1 represents 0.324 inch, as the approximate distance, relative to the two closest points of the respective elements, between adjacent stress receptor elements 12 located on the same side of central longitudinal axis 10. D4 represents 0.091 inch, which is the approximate distance, relative to the two closest points of the respective elements, between a stress receptor element 12 and the nearest stress transfer and dissipation element 16. D2 represents 0.071 inch, as the approximate distance, relative to the two closest points of the respective elements, between a first interior end 18 of a stress transfer and dissipation element and the nearest, with respect to the designated stress transfer and dissipation element 14, stress termination element 16 located on the opposite side of central longitudinal axis 10. D3 represents 0.069 inch, as the approximate distance, relative to the two closest points of the respective elements, between the second peripheral end 20 of a stress transfer and dissipation element 14 and the nearest, with respect to the designated stress transfer and dissipation element 14, stress termination element 16.

In preferred embodiments, stress receptor elements 12 are spaced at first common distances D1 from each other along the length of the bond pattern 1, and stress transfer and dissipation elements 14 are spaced at second common distances D4 from the stress receptor elements 12, less than the spacing of the stress receptor elements 12 from each other. Stress termination elements 16 may or may not be included in a given embodiment, but if so, stress termination elements 16 are preferably spaced at a third distance D2 from the stress transfer and dissipation elements 14, less than the spacing of the second common distance D4 of stress transfer and dissipation elements 14 from stress receptor elements 12.

In general, stress receptor elements 12, as the outer-most elements of the bond pattern, are spaced farther from each other than they are from adjacent but more inwardly-disposed elements of the bond pattern such as adjacent transfer and dissipation elements. The transfer and dissipation elements are angled inwardly into the bond pattern at angles "α" of about 15 degrees to about 65 degrees from central longitudinal axis 10. Preferred angles are about 20 degrees to about 50 degrees, with a most preferred angle of about 30 degrees. As seen in FIG. 5, adjoining ones of the transfer and dissipation elements which are on opposite sides of a given stress receptor element extend at angles a of opposite direction with respect to the central longitudinal axis.

Referring to FIGS. 1 and 5, in an embodiment of the invention indicative of an absorbent article, the width of the bond pattern between side edges 2 and 6 is preferably about 4 millimeters to about 14 millimeters, and more preferably about 5 millimeters to about 12 millimeters. Narrower patterns can employ less material. Wider patterns have greater potential for effectively absorbing and dissipating stresses imposed on the pattern.

The bond pattern functions as a compilation of different functioning bond elements. The side edges (indicated in FIG. 1 as reference numbers 2 and 6) of the bond pattern are defined generally by those areas of the respective webs or other work piece elements which participate in absorbing and dissipating, by operation of the bond pattern, stresses received into the bond pattern.

As stress is applied to a bonded composite demonstrating the bond pattern of the current invention, stress is initially received at a side edge of the bond pattern and is typically transferred to the next closest bond element. By designing the bond pattern so that the next closest bond element is located inwardly on the bond pattern, the stress is transferred inwardly of the bond pattern and away from the respective side edge, whereby the amount of stress dissipated, absorbed at the side edge is lessened by the amount of stress which is transferred inwardly in the bond pattern. To the extent the stress is reduced at the side edges, the side edges may have unused stress-accepting capacity, whereby the bond patterns of the invention have increased stress-bearing capacity compared to conventional bond patterns.

The increased stress-bearing capacity of the new bond pattern is due to the internal workings of the individual bond elements. Stress receptor elements 12 initially receive and relay stresses to the next closest bond element in the pattern, namely to stress transfer and dissipation elements 14. Stress transfer and dissipation elements 14 direct stresses inwardly into the interior portion of the bond pattern according to angle α. The stresses are dissipated in the interior portion of the bond pattern. Transfer and dissipation elements 14 have second ends 20 disposed toward the side edges of the bond pattern 1, and first ends 18 disposed relatively inwardly from the side edges of the pattern. The second ends 20 have greater radii of curvature than the first ends 18. The second ends 20 tend to receive stress imposed from outside the bond pattern, and the first ends 18 tend to dissipate stress imposed on the respective bond element. Stress termination elements 16 tend to accumulate and coordinate termination of stresses transferred into an interior portion of the bond pattern.

Adjoining first and second ones of the stress transfer and dissipation elements 14 are on opposite sides of a given stress receptor element, and collectively extend in a line generally parallel with the lines of stress receptor elements along the length of the bond pattern. Given the opposing directions of angles α on adjacent such transfer and dissipation elements, the transfer and dissipation elements can collectively transfer, to the interior of the bond pattern, stress vectors coming from either lengthwise direction along the length of the bond pattern. The angles "α" of transfer and dissipation elements 14 tend to promote the transfer of stresses to the interior of the bond pattern, and are effective to transfer at least part of the stress received from any direction, away from the side edges and toward the interior of the bond pattern. Additionally, because of the similarity of both opposing pattern combinations located on each side of the central longitudinal axis 10, the bond pattern can effectively alleviate force exerted from either side of the pattern.

Because of the resilience of the materials commonly used, and disclosed for use with e.g. the body side liner and the outer cover of absorbent articles, stresses exerted from any direction can be directed at least in part inwardly toward the longitudinal axis, where stresses are traditionally not dissipated. By distributing significant fractions of the stresses to the interior of the bond pattern, use of the invention relieves a portion of the stress that is typically borne by, and retained at, side edge portions of the bond pattern, whereby the bond pattern can tolerate more overall stress than a conventional bond pattern without exceeding the stress tolerance at the respective side edge of the bond pattern. Thus, not only do bond patterns of the invention significantly reduce the perforation-like tendency of conventional linearly-arranged bonding patterns, but such patterns also are capable of tolerating and distributing greater amounts of stress than conventional patterns.

In accord with the teaching herein, the instant invention increases the tear strength of a bonded composite at the bond pattern, compared to conventional bond patterns.

By spacing from each other the bond elements which are proximate the side edges of the bond pattern, the pattern design discourages propagation of the stresses to adjacent ones of the stress receptor elements, forcing the stress to instead propagate away from the side edges and toward the interior of the bond pattern.

By limiting the fraction of the bond pattern represented by the bond elements to the recited maximums such as e.g. 40 percent of the bond pattern area, the bond pattern can transfer certain of the stresses to the unbonded portions of the material adjacent the stressed bond elements. The unbonded, and stressed, material can then further propagate the stress, as well as absorbing some of the stress as potential energy e.g. by stress-induced elongation, by fiber stretching, by frictional fiber-to-fiber stress engagement, and the like.

FIG. 5 illustrates two stress vectors 72 and 74 being imposed on the bond pattern. Both stress vectors are imposed from a common direction, but impact the bond pattern at different locations. Stress vector 72 has a minor longitudinal component, and a major transverse component. Vector 72 is imposed on the bond pattern at the locus of stress receptor element 12A. In view of the fact that the stress is imposed on the bond pattern specifically at receptor element 12A, receptor element 12A receives substantially all of the stress imposed by vector 72. The stress then becomes distributed throughout the area of receptor element 12A.

From receptor element 12A, the stress is passed across those portions 76A and 76B of the unbonded area 76 of the pattern which lie between receptor element 12A and adjacent transfer and dissipation elements 14A and 14B, and reaches elements 14A, 14B in reduced strength, reduced by the amount of the force which is absorbed by the unbonded material in the form of stretch and other potential energy changes to the web, and further reduced by the amount of force dissipated in receptor element 12A. In the illustrated example, the amount of force which arrives at, and is received by each of the transfer and dissipation elements 14A and 14B is a portion of the force originally imposed on receptor element 12A, reduced by the small amount of force which is dissipated in receptor element 12A, and further reduced by the amount of force which is dissipated in areas 76A, 76B as the force is transferred to elements 14A, 14B.

Once the stress reaches transfer and dissipation elements 14A, 14B, the stress is then distributed throughout the respective areas of transfer and dissipation elements 14A, 14B. Namely, the force is transferred according to the orientations of elements 14A, 14B in the bond pattern. Thus, given the directional orientations of elements 14A, 14B, the stress is transferred in an inward direction toward central axis 10. The effect of such transfer is to move the force away from the respective side edge 6, whereby the amount of force concentrated at side edge 6 is reduced from that which would have to be withstood and dissipated at the side edge of a conventional bond pattern.

Returning to FIG. 5 and elements 14A. 14B, as the force is distributed throughout a transfer and dissipation element, the force tends to become concentrated at that portion of the element, opposite the locus of force entry into the bond element, which has the smallest radius of curvature. Thus the force tends to project toward end 18. This tendency for the force to project toward end 18 further contributes to propagation of the force toward the interior of the bond pattern.

From elements 14A and 14B, the stress is passed across additional portions 76C and 76D of the unbonded area 76 of the pattern which lie between transition and dissipation elements 14A, 14B and adjacent ones of the stress termination element and a transfer and dissipation element on the opposing side of the bond pattern, namely across axis 10. Thus, the stress passes largely to stress termination element 16A and to transfer and dissipation element 14C.

Some of the stress may further be transferred, for example, from termination element 16A to either or both of transfer and dissipation element 14C and 14D. Some of the stress which reaches element 14C may further be transferred, for example, from element 14C to receptor element 12B. Some of the stress which reaches element 14D may further be transferred, for example, from element 14D to receptor element 12C.

The above recited propagation paths are illustrated in general as short dashed outlines 78 indicating the primary locations and directions of flow of force within the bond pattern. Some amounts of the force are dissipated in areas of the bond pattern adjoining the illustrated paths. As suggested by the propagation patterns illustrated, some of the force can pass through the bond pattern and be absorbed by web material on the opposite side of the bond pattern. Preferably, however, the full force of the stress is absorbed within the bond pattern. The fraction of the bond area which is occupied by bond elements is a factor in how much of the force is absorbed, dissipated, and terminated in the bond pattern, and respectively how much of the force passes through the bond pattern to the opposing side of the bond pattern.

Returning to FIG. 5, the illustrated propagation paths 78 indicate the enlarged area of the bond pattern, both lengthwise and across width "W," which participates in dissipating a force imposed on receptor element 12A.

Force vector 74 in general propagates in the same manner, using the same principles, as the propagation of force vector 72, with one primary difference. The difference is that force vector 74 is imposed on the bond pattern at a location between stress receptor elements 12A and 12D. Thus, at the point where force 74 is imposed on the bond pattern, the closest bond elements to side edge 6 are transfer and dissipation elements 14B and 14E. Accordingly, while some of the stress may be received by one or both of stress receptor elements 12A or 12D, the primary initial receptors of force 74 are transfer and dissipation elements 14B and 14E. Again, the force is transferred to elements 14B, 14E from the side edges of the bond pattern where the bond pattern can be most vulnerable to failure.

In summary then, stress receptor elements serve to define the side edges of the bond pattern while being sufficiently spaced that it is difficult for stress imposed on a given receptor element to propagate to an adjacent element at the respective side edge. Rather, at least one transfer and dissipation element is closer to the respective receptor element than an adjacent receptor element, whereby the stress is preferentially transferred to one or more transfer and dissipation elements. In addition, the bond element density is sufficiently low that stresses can propagate from the element or elements initially receiving the stress, in multiple directions to multiple adjacent bond elements at multiple levels of distance from the receiving side edge, thereby to distribute the stress over an expanded area of the bond pattern. By distributing the stress over an expanded area of the bond pattern, the stress concentration at any one locus in the bond pattern, especially at the receiving side edge of the bond pattern, is substantially reduced. By reducing the stress concentration at the side edge, the capacity of the bond pattern increases for the bond pattern to tolerate stress, thus reducing the undesired incidence of failure of either the bond pattern or the web material at or adjacent the side edge of the bond pattern. Therefore, while fractures tend to occur in a straight path, the bond pattern changes the linear path of least resistance for fracture by imposing a longer non-straight course of fracture whereby risk of fracturing the bonded composite is reduced.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A bonded composite, comprising:
   (a) as a first element, a first layer of flexible sheet material;
   (b) as a second element, a second layer of flexible sheet material; and
   (c) a multiplicity of bond elements bonding said first and second layers of flexible sheet material to each other and collectively defining a bond pattern, the bond pattern having a pattern length and a pattern width, the pattern length and pattern width, in combination, defining an overall bond area of the bond pattern, the bond pattern further having a central longitudinal axis, (d) as ones of said bond elements, a first sub-array of separate, distinct, and spaced stress receptor elements disposed in a first line along extremities of the width of, and along the length of, the bond pattern, and (e) as ones of said bond elements, a second sub-array of separate and distinct elongate transfer and dissipation elements spaced along the length of the bond pattern, and generally inwardly of the stress receptor elements, adjoining first and second ones of the stress transfer and dissipation elements which are on opposite sides of a given stress receptor element collectively extending in a second line generally parallel with and adjacent the first line of stress receptor elements, and extending at angles a of opposite direction with respect to the central longitudinal axis.

2. A bonded composite as in claim 1, further comprising, as ones of said bond elements, a third sub-array of longitudinally-oriented separate, distinct, and spaced stress termination elements disposed generally inwardly of the transfer and dissipation elements, on opposing sides of, adjacent, and oriented generally along, the longitudinal axis, the stress termination elements accumulating and coordinating termination of stresses transferred into an interior portion of the bond pattern.

3. A bonded composite as in claim 1, said transfer and dissipation elements having first ends disposed relatively inwardly from the extremities of the width of the bond pattern and second ends disposed toward the extremities of the width of the bond pattern.

4. A bonded composite as in claim 2, the bond pattern comprising first and second opposing pattern combinations corresponding to first and second sides of the bond pattern, on opposing sides of the longitudinal axis, each such pattern combination comprising ones of said stress receptor elements along extremities of the pattern width, ones of the transfer and dissipation elements being disposed inwardly of the stress receptor elements, and ones of the stress termination elements being disposed inwardly of the transfer and dissipation elements, each pattern combination comprising a plurality of repeat patterns spaced along the length of the bond pattern.

5. A bonded composite as in claim 4, the first and second pattern combinations being substantially the same.

6. A bonded composite as in claim 5, the first and second pattern combinations being positioned along the length of the bond pattern, respective ones of the repeat patterns of the first pattern combination being longitudinally offset from the respective closest adjacent repeat patterns of the second pattern combination.

7. A bonded composite as in claim 6, the respective first and second pattern combinations each being internally symmetric with respect to a selected said stress receptor element of each such pattern combination, each such pattern combination thus defining left and right mirror images of pattern elements on opposing sides of a selected said stress receptor element.

8. A bonded composite as in claim 1 wherein formation of bonds corresponding to said bond elements comprises application of thermal energy to at least one of said first and second layers of flexible sheet material.

9. A bonded composite as in claim 1 wherein formation of bonds corresponding to said bond elements comprises application of ultrasonic-frequency energy to at least one of said first and second layers of flexible sheet material.

10. A bonded composite as in claim 1 wherein at least one of said first layer of flexible sheet material and said second layer of flexible sheet material comprises polymeric material selected from the group consisting of polyolefins, polyesters, and polyamides, and copolymers, mixtures, and blends of said polymeric materials.

11. A bonded composite as in claim 1 wherein at least one of said first layer of flexible sheet material and said second layer of flexible sheet material comprises a fibrous web defining a multiplicity of randomly-spaced small openings extending from a major surface of the web into the web.

12. A bonded composite as in claim 1, said stress receptor elements and said transfer and dissipation elements, in combination, alternating along the length, and on opposing sides, of the central longitudinal axis, and thereby providing side-to-side support balance to a bond element area defined in the bond pattern.

13. A bonded composite as in claim 1 wherein the bond elements occupy from about percent to about 40 percent of the overall bond area of the bond pattern.

14. A bonded composite as in claim 1 wherein the bond elements occupy from about 12 percent to about 30 percent of the overall bond area of the bond pattern.

15. A bonded composite as in claim 1 wherein the bond elements occupy from about 15 percent to about 25 percent of the overall bond area of the bond pattern.

16. A bonded composite, comprising:

(a) as a first element, a first layer of flexible sheet material;

(b) as a second element, a second layer of flexible sheet material; and (c) a multiplicity of bond elements bonding said first and second layers of flexible sheet material to each other and collectively defining a bond pattern, the bond pattern having a pattern length and a pattern width, the pattern length and pattern width, in combination, defining an overall bond area of the bond pattern, the bond pattern further having a central longitudinal axis, (d) as ones of said bond elements, a first sub-array of separate, distinct, and spaced stress receptor elements; and (e) as ones of said bond elements, a second sub-array of separate and distinct transfer and dissipation elements, ones of said stress receptor elements being aligned with each other in a first line generally parallel to the central longitudinal axis, a second line of said transfer and dissipation elements being disposed between said line of stress receptor elements and said central longitudinal axis and extending generally parallel to the central longitudinal axis, first and second adjacent ones of said transfer and dissipation elements defining a first portion of the length of said bond pattern, the first portion of the length of the bond pattern being shorter than the end-to-end distance between adjacent ones of said stress receptor elements, the end-to-end distance being measured to include an end-to-end dimension of one of said stress receptor elements, measured along the length of said bond pattern.

17. A bonded composite as in claim 16, the bond pattern comprising, (i) as ones of said bond elements, a first sub-array of longitudinally-oriented ones of said stress receptor elements disposed adjacent extremities of the bond pattern width, and along the length of, the bond pattern, and (ii) as ones of said bond elements, a second sub-array of longitudinally-oriented ones of said transfer and dissipation elements spaced along the length of the bond pattern, inwardly of the stress receptor elements, respective said transfer and dissipation elements having first ends disposed at an interior portion of the bond pattern, and extending away from the central longitudinal axis and terminating at second ends, the second ends being disposed, when considered along the length of the bond pattern, between locations along the length of the bond pattern, of respective ones of said stress receptor elements, adjoining first and second ones of the stress transfer and dissipation elements which are on opposite sides of a given stress receptor element collectively extending in a second line generally parallel with and adjacent the first line of stress receptor elements, and extending at angles a of opposite direction with respect to the central longitudinal axis.

18. A bonded composite as in claim 17, further comprising, as ones of said bond elements, a third sub-array of longitudinally-oriented separate, distinct, and spaced stress termination elements disposed generally inwardly of the transfer and dissipation elements, on opposing sides of, adjacent, and oriented generally along, the longitudinal axis, the stress termination elements accumulating and coordinating termination of stresses transferred into an interior portion of the bond pattern.

19. A bonded composite as in claim 17, said transfer and dissipation elements having first ends disposed relatively inwardly from extremities of the width of the bond pattern and second ends disposed toward the extremities of the width of the bond pattern.

20. A bonded composite as in claim 18, the bond pattern comprising first and second opposing pattern combinations corresponding to first and second sides of the bond pattern, on opposing sides of the longitudinal axis, each such pattern combination comprising ones of said stress receptor elements along extremities of the pattern width, ones of the transfer and dissipation elements being disposed inwardly of the stress receptor elements, and ones of the stress termination elements being disposed inwardly of the transfer and dissipation elements, each pattern combination comprising a plurality of repeat patterns spaced along the length of the pattern.

21. A bonded composite as in claim 20, the first and second pattern combinations being substantially the same.

22. A bonded composite as in claim 21, the first and second pattern combinations being positioned along the length of the pattern, respective ones of the respective patterns of the first pattern combination being longitudinally offset from the respective closest adjacent repeat patterns of the second pattern combination.

23. A bonded composite as in claim 22, the respective first and second pattern combinations each being internally symmetric with respect to a selected stress receptor element of each such pattern combination, each such pattern combination thus defining left and right mirror images of pattern elements on opposing sides of a selected said stress receptor element.

24. A bonded composite as in claim 16 wherein formation of bonds corresponding to said bond elements comprises application of thermal energy to at least one of said first and second layers of flexible sheet material.

25. A bonded composite as in claim 16 wherein formation of bonds corresponding to said bond elements comprises application of ultrasonic-frequency energy to at least one of said first and second layers of flexible sheet material.

26. A bonded composite as in claim 16 wherein at least one of said first layer of flexible sheet material and said second layer of flexible sheet material comprises polymeric material selected from the group consisting of polyolefins, polyesters, and polyamides, and copolymers, mixtures, and blends of said polymeric materials.

27. A bonded composite as in claim 16 wherein at least one of said first layer of flexible sheet material and said second layer of flexible sheet material comprises a fibrous web defining a multiplicity of randomly-spaced small openings extending from a major surface of the web into the web.

28. A bonded composite as in claim 17, said stress receptor elements and said transfer and dissipation elements, in combination, alternating along the length, and on opposing sides, of the central longitudinal axis, and thereby providing side-to-side support balance to a bond element area defined by the bond pattern.

29. A bonded composite as in claim 16 wherein the bond elements occupy from about 10 percent to about 40 percent of the overall bond area of the bond pattern.

30. A bonded composite, comprising:
(a) as a first element, a first layer of flexible sheet material;
(b) as a second element, a second layer of flexible sheet material; and
(c) a multiplicity of bond elements bonding said first and second layers of flexible sheet material to each other and collectively defining a bond pattern,
the bond pattern having a pattern length and a pattern width, the pattern length and pattern width, in combination, defining an overall area of the bond pattern, the bond pattern further having a central longitudinal axis,
(d) as ones of said bond elements, a first sub-array of longitudinally-oriented separate and distinct stress receptor elements disposed in a first line along extremities of the width of the bond pattern, each said stress receptor element having opposing first and second ends proximate a such extremity of the width of the bond pattern,
(e) as ones of said bond elements, a second sub-array of separate and distinct transfer and dissipation elements disposed inwardly of the stress receptor elements,
a first distance from the first end of a given stress receptor element to the closest one of said transfer and dissipation elements to the first end being less than a second distance to the stress receptor element in the first line and next adjacent the first end of the given stress receptor element, a third distance from the second end of the given stress receptor element to the closest one of said transfer and dissipation elements to the second end being less than a fourth distance to the stress receptor element in the first line next adjacent the second end of the given stress receptor element.

31. A bonded composite as in claim 30, respective transfer and dissipation elements having first ends disposed on the interior portion of the bond pattern, and extending to second ends adjacent extremities of the width of the bond pattern between respective ones of said stress receptor elements.

32. A bonded composite as in claim 30 wherein formation of bonds corresponding to said bond elements comprises application of thermal energy to at least one of said first and second layers of flexible sheet material.

33. A bonded composite as in claim 30 wherein formation of bonds corresponding to said bond elements comprises application of ultrasonic-frequency energy to at least one of said first and second layers of flexible sheet material.

34. A bonded composite as in claim 30 wherein at least one of said first of flexible sheet material and said second layer of flexible sheet material comprises polymeric material selected from the group consisting of polyolefins, polyesters, and polyamides, and copolymers, mixtures, and blends of said polymeric materials.

35. A bonded composite as in claim 30 wherein at least one of said first layer of flexible sheet material and said second layer of flexible sheet material comprises a fibrous web defining a multiplicity of randomly-spaced small openings extending from a major surface of the web into the web.

36. An absorbent article having a front portion and a rear portion, and a crotch portion extending between said front portion and said rear portion, said absorbent article comprising:
   (a) as a first element, a first layer of flexible sheet material;
   (b) as a second element, a second layer of flexible sheet material;
   (c) a multiplicity of bond elements bonding said first and second layers of flexible sheet material to each other and collectively defining a bond pattern; and
   (d) an absorbent core,
      the bond pattern having a pattern length and a pattern width, the pattern length and pattern width, in combination, defining an overall bond area of the bond pattern, the bond pattern further having a central longitudinal axis,
   (e) as ones of said bond elements, a first sub-array of separate, distinct, and spaced stress receptor elements disposed in a first line along extremities of the width of, and along the length of, the bond pattern, and
   (f) as ones of said bond elements, a second sub-array of separate and distinct elongate transfer and dissipation elements spaced along the length of the bond pattern, and generally inwardly of the stress receptor elements, adjoining first and second ones of the stress transfer and dissipation elements which are on opposite sides of a given stress receptor element and collectively extending in a second line generally parallel with and adjacent the first line of stress receptor elements, extending at angles a of opposite direction with respect to the central longitudinal axis.

37. An absorbent article as in claim 36, further comprising, as ones of said bond elements, a third sub-array of longitudinally-oriented separate, distinct, and spaced stress termination elements disposed generally inwardly of the transfer and dissipation elements, on opposing sides of, adjacent, and oriented generally along, the longitudinal axis, the stress termination elements accumulating and coordinating termination of stresses transferred into an interior portion of the bond pattern.

38. An absorbent article as in claim 36, said transfer and dissipation elements having first ends disposed relatively inwardly from the extremities of the width of the bond pattern and second ends disposed toward the extremities of the width of the bond pattern.

39. An absorbent article as in claim 37, the bond pattern comprising first and second opposing pattern combinations corresponding to first and second sides of the bond pattern, on opposing sides of the longitudinal axis, each such pattern combination comprising ones of said stress receptor elements along extremities of the pattern width, ones of the transfer and dissipation elements being disposed inwardly of the stress receptor elements, and ones of the stress termination elements being disposed inwardly of the transfer and dissipation elements, each pattern combination comprising a plurality of repeat patterns spaced along the length of the bond pattern.

40. An absorbent article as in claim 39, the first and second pattern combinations being substantially the same.

41. An absorbent article as in claim 40, the first and second pattern combinations being positioned along the length of the bond pattern, respective ones of the repeat patterns of the first pattern combination being longitudinally offset from the respective closest adjacent repeat patterns of the second pattern combination.

42. An absorbent article as in claim 41, the respective first and second pattern combinations each being internally symmetric with respect to a selected said stress receptor element of each such pattern combination, each such pattern combination thus defining left and right mirror images of pattern elements on opposing sides of a selected said stress receptor element.

43. An absorbent article as in claim 36 wherein formation of bonds corresponding to said bond elements comprises application of thermal energy to at least one of said first and second layers of flexible sheet material.

44. An absorbent article as in claim 36 wherein formation of bonds corresponding to said bond elements comprises application of ultrasonic-frequency energy to at least one of said first and second layers of flexible sheet material.

45. An absorbent article as in claim 36 wherein at least one of said first layer of flexible sheet material and said second layer of flexible sheet material comprises a fibrous web defining a multiplicity of randomly-spaced small openings extending from a major surface of the web into the web.

46. An absorbent article as in claim 36 wherein said first layer of flexible sheet material comprises an outer cover, wherein said second layer of flexible sheet material comprises a body side liner, and wherein at least one of said outer cover and said body side liner comprises polymeric material selected from the group consisting of polyolefins, polyesters, and polyamides, and mixtures, copolymers, and blends of said polymeric materials.

47. An absorbent article as in claim 36 wherein said second layer of flexible sheet material comprises a body side liner and wherein said body side liner comprises material selected from the group consisting of porous foams, reticulated foams, apertured polymeric films, polymeric fibers, and natural fibers.

48. An absorbent article as in claim 36, said stress receptor elements and said transfer and dissipation elements, in combination, alternating along the length, and on opposing sides, of the central longitudinal axis, and thereby providing side-to-side support balance to a bond element area of the bond pattern.

49. An absorbent article as in claim 36 wherein the bond elements occupy from about 10 percent to about 40 percent of the overall bond area of the bond pattern.

50. An absorbent article as in claim 36 wherein the bond elements occupy from about 12 percent to about 30 percent of the overall bond area of the bond pattern.

51. An absorbent article as in claim 36 wherein the bond elements occupy from about 15 percent to about 25 percent of the overall bond area of the bond pattern.

52. An absorbent article as in claim 36, the length of said bond pattern extending from the front portion of said absorbent article to the rear portion of said absorbent article.

53. An absorbent article as in claim 36 wherein the crotch portion of said absorbent article is devoid of said bond pattern.

54. An absorbent article as in claim 36, the width of said bond pattern being about 4 millimeters to about 14 millimeters.

55. An absorbent article as in claim 36, the width of said bond pattern being about 5 millimeters to about 12 millimeters.

56. An absorbent article as in claim 36 wherein said absorbent article comprises a feminine hygiene article.

57. An absorbent article as in claim 36 wherein said absorbent article comprises a diaper.

58. An absorbent article as in claim 36 wherein said absorbent article comprises an adult incontinence product.

59. An absorbent article having a front portion and a rear portion, and a crotch portion extending between said front portion and said rear portion, said absorbent article comprising:

(a) as a first element, a first layer of flexible sheet material;

(b) as a second element, a second layer of flexible sheet material;

(c) a multiplicity of bond elements bonding said first and second layers of flexible sheet material to each other and collectively defining a bond pattern; and (d) an absorbent core, the bond pattern having a pattern length and a pattern width, the pattern length and pattern width, in combination, defining an overall bond area of the bond pattern, the bond pattern further having a central longitudinal axis, (e) as ones of said bond elements, a first sub-array of separate, distinct, and spaced stress receptor elements; and (f) as ones of said bond elements, a second sub-array of separate and distinct elongate transfer and dissipation elements, ones of said stress receptor elements being aligned with each other in a first line generally parallel to the central longitudinal axis, a second line of said transfer and dissipation elements being disposed between said line of stress receptor elements and said central longitudinal axis and extending generally parallel to the central longitudinal axis, first and second adjacent ones of said transfer and dissipation elements defining a first portion of the length of said bond pattern, the first portion of the length of the bond pattern being shorter than the end-to-end distance between adjacent ones of said stress receptor elements, the end-to-end distance being measured to include an end-to-end dimension of one of said stress receptor elements, measured along the length of said bond pattern.

60. An absorbent article as in claim 59, said stress receptor elements being disposed adjacent extremities of the bond pattern width of, and along the length of, the bond pattern, said transfer and dissipation elements being spaced along the length of the bond pattern, inwardly of the stress receptor elements, respective said transfer and dissipation elements having first ends disposed at an interior portion of the bond pattern, and extending outwardly away from the central longitudinal axis and terminating at second ends, the second ends being disposed, when considered along the length of the bond pattern between locations along the length of the bond pattern of respective ones of said stress receptor elements, adjoining ones of the stress transfer and dissipation elements which are on opposite sides of a given stress receptor element and which collectively extend in the second line at angles a of opposite direction with respect to the central longitudinal axis.

61. An absorbent article as in claim 60, further comprising, as ones of said bond elements, a third sub-array of longitudinally-oriented separate, distinct, and spaced stress termination elements disposed generally inwardly of the transfer and dissipation elements, on opposing sides of, adjacent, and oriented generally along, the longitudinal axis, the stress termination elements accumulating and coordinating termination of stresses transferred into an interior portion of the bond pattern.

62. An absorbent article as in claim 60, said transfer and dissipation elements having first ends disposed relatively inwardly from extremities of the width of the bond pattern and second ends disposed toward the extremities of the width of the bond pattern.

63. An absorbent article as in claim 61, the bond pattern comprising first and second opposing pattern combinations corresponding to first and second sides of the bond pattern, on opposing sides of the longitudinal axis, each such pattern combination comprising ones of said stress receptor elements along extremities of the pattern width, ones of the transfer and dissipation elements being disposed inwardly of the stress receptor elements, and ones of the stress termination elements being disposed inwardly of the transfer and dissipation elements, each pattern combination comprising a plurality of repeat patterns spaced along the length of the pattern.

64. An absorbent article as in claim 63, the first and second pattern combinations being substantially the same.

65. An absorbent article as in claim 64, the first and second pattern combinations being positioned along the length of the pattern, respective ones of the respective patterns of the first pattern combination being longitudinally offset from the respective closest adjacent repeat patterns of the second pattern combination.

66. An absorbent article as in claim 65, the respective first and second pattern combinations each being internally symmetric with respect to a selected stress receptor element of each such pattern combination, each such pattern combination thus defining left and right mirror images of pattern elements on opposing sides of a selected said stress receptor element.

67. An absorbent article as in claim 59 wherein formation of bonds corresponding to said bond elements comprises application of thermal energy to at least one of said first and second layers of flexible sheet material.

68. An absorbent article as in claim 59 wherein formation of bonds corresponding to said bond elements comprises application of ultrasonic-frequency energy to at least one of said first and second layers of flexible sheet material.

69. An absorbent article as in claim 59 wherein at least one of said first layer of flexible sheet material and said second layer of flexible sheet material comprises polymeric material selected from the group consisting of polyolefins, polyesters, and polyamides, and copolymers, mixtures, and blends of said polymeric materials.

70. An absorbent article as in claim 59 wherein at least one of said first layer of flexible sheet material and said second layer of flexible sheet material comprises a fibrous web defining a multiplicity of randomly-spaced small openings extending from a major surface of the web into the web.

71. An absorbent article as in claim 60, said stress receptor elements and said transfer and dissipation elements, in combination, alternating along the length, and on opposing sides, of the central longitudinal axis, and thereby providing side-to-side support balance to a bond element area defined by the bond pattern.

72. An absorbent article as in claim 59 wherein the bond elements occupy from about 10 percent to about 40 percent of the overall bond area of the bond pattern.

73. A bonded composite as in claim 1, said stress receptor elements defining lengths thereof extending generally along the length of the bond pattern, a first distance between respective first and second adjacent ones of said stress receptor elements in the first line being greater than a second distance between at least one of said first and second stress receptor elements and the closest adjacent one of said transfer and dissipation elements.

74. A bonded composite as in claim 16, said stress receptor elements being disposed in a first line along extremities of the width of, and along the length of, the bond pattern, said transfer and dissipation elements being disposed in a second line generally parallel with and adjacent the first line of stress receptor elements, said stress receptor elements defining lengths thereof extending generally along the length of the bond pattern, a first distance between respective first and second adjacent ones of said stress receptor elements in the first line being greater than a second distance between at least one of said first and second stress receptor elements and the closest adjacent one of said transfer and dissipation elements.

75. A bonded composite as in claim 30, said stress receptor elements defining lengths thereof extending generally along the length of the central longitudinal axis, a first distance between respective first and second adjacent ones of said stress receptor elements in the first line being greater than a second distance between at least one of said first and second stress receptor elements and the closest adjacent one of said transfer and dissipation elements.

76. An absorbent article as in claim 36, said stress receptor elements defining lengths thereof extending generally along the length of the central longitudinal axis, a first distance between respective first and second adjacent ones of said stress receptor elements in the first line being greater than a second distance between at least one of said first and second stress receptor elements and the closest adjacent one of said transfer and dissipation elements.

77. An absorbent article as in claim 59, said stress receptor elements being disposed in a first line along extremities of the width of, and along the length of, the bone pattern, said transfer and dissipation elements being disposed in a second line generally parallel with and adjacent the first line of stress receptor elements, said stress receptor elements defining lengths thereof extending generally along the length of the central longitudinal axis, a first distance between respective first and second adjacent ones of said stress receptor elements in the first line being greater than a second distance between at least one of said first and second stress receptor elements and the closest adjacent one of said transfer and dissipation elements.

78. An absorbent article having a front portion and a rear portion, and a crotch portion extending between said front portion and said rear portion, said absorbent article comprising:

(a) as a first element, a first layer of flexible sheet material;

(b) as a second element, a second layer of flexible sheet material;

(c) a multiplicity of bond elements bonding said first and second layers of flexible sheet material to each other and collectively defining a bond pattern; and (d) an absorbent core,
the bond pattern having a pattern length and a pattern width, the pattern length and pattern width, in combination, defining an overall bond area of the bond pattern, the bond pattern further having a central longitudinal axis, (e) as ones of said bond elements, a first sub-array of longitudinally-oriented separate, distinct, and spaced stress receptor elements disposed in a first line along extremities of the width of the bond pattern, each said stress receptor element having opposing first and second ends proximate a such extremity of the width of the bond pattern, and (f) as ones of said bond elements, a second sub-array of separate and distinct elongate transfer and dissipation elements disposed inwardly of the stress receptor elements,
a first distance from the first end of a given stress receptor element to the closest one of said transfer and dissipation elements to the first end being less than a second distance to the stress receptor element in the first line and next adjacent the first end of the given stress receptor element, a third distance from the second end of the given stress receptor element to the closest one of said transfer and dissipation elements to the second end being less than a fourth distance to the stress receptor element in the first line next adjacent the second end of the given stress receptor element.

79. An absorbent article as in claim 78, further comprising, as ones of said bond elements, a third sub-array of longitudinally-oriented separate, distinct, and spaced stress termination elements disposed generally inwardly of the transfer and dissipation elements, on opposing sides of, adjacent, and oriented generally along, the longitudinal axis.

80. An absorbent article as in claim 78, said transfer and dissipation elements having first ends disposed relatively inwardly from the extremities of the width of the bond pattern and second ends disposed toward the extremities of the width of the bond pattern.

81. An absorbent article as in claims 79, the bond pattern comprising first and second opposing pattern combinations corresponding to first and second sides of the bond pattern, on opposing sides of the longitudinal axis, each such pattern combination comprising ones of said stress receptor elements along extremities of the pattern width, ones of the transfer and dissipation elements being disposed inwardly of the stress receptor elements, and ones of the stress termination elements being disposed inwardly of the transfer and dissipation elements, each pattern combination comprising a plurality of repeat patterns spaced along the length of the bond pattern, the first and second pattern combinations being positioned along the length of the bond pattern, respective ones of the repeat patterns of the first pattern combination being longitudinally offset from the respective closest adjacent repeat patterns of the second pattern combination.

82. An absorbent article as in claim 81, the respective first and second pattern combinations each being internally symmetric with respect to a selected said stress receptor element of each such pattern combination, each such pattern combination thus defining left and right mirror images of pattern elements on opposing sides of a selected said stress receptor element.

83. An absorbent article as in claim 78, the width of said bond pattern being about 4 millimeters to about 14 millimeters.

84. An absorbent article as in claim 78, the width of said bond pattern being about 5 millimeters to about 12 millimeters.

* * * * *